(12) United States Patent
Ihara et al.

(10) Patent No.: US 6,772,063 B2
(45) Date of Patent: Aug. 3, 2004

(54) NAVIGATION DEVICE, DIGITAL MAP DISPLAY SYSTEM, DIGITAL MAP DISPLAYING METHOD IN NAVIGATION DEVICE, AND PROGRAM

(75) Inventors: Koji Ihara, Chiba (JP); Atsushi Kuribayashi, Kanagawa (JP); Tatsuya Yamamoto, Chiba (JP); Hitomi Sahara, Tokyo (JP); Takeshi Tsukada, Kanagawa (JP); Yoshinori Watanabe, Aichi (JP)

(73) Assignees: Sony Corporation, Tokyo (JP); Denso Corporation, Aichi (JP)

( * ) Notice: Subject to any disclaimer, the term of this patent is extended or adjusted under 35 U.S.C. 154(b) by 30 days.

(21) Appl. No.: 10/233,648

(22) Filed: Sep. 3, 2002

(65) Prior Publication Data

US 2003/0050753 A1 Mar. 13, 2003

(30) Foreign Application Priority Data

Sep. 7, 2001 (JP) ...................................... P2001-272694

(51) Int. Cl.$^7$ ............................................. G01C 21/30
(52) U.S. Cl. ...................... 701/208; 701/207; 701/212; 340/988; 340/990
(58) Field of Search ........................ 701/200, 207–208, 701/211–212, 209, 213, 214; 340/988, 990, 995.1, 992

(56) References Cited

U.S. PATENT DOCUMENTS 4,970,682 A * 11/1990 Beckwith et al. ............... 707/1
5,140,532 A * 8/1992 Beckwith et al. ............ 358/1.1

* cited by examiner

Primary Examiner—Gertrude A. Jeanglaude
(74) Attorney, Agent, or Firm—Jay H. Maioli

(57) ABSTRACT

A navigation device including a registration unit for registering an index designated by a user's operation and data of a spot coordinate in association with each other, and a display for displaying a plurality of registered indexes as a list, the display displaying, together with the list, a digital map of a spot coordinate corresponding to an active index selected from the list of indexes.

9 Claims, 8 Drawing Sheets

| NO | NAME | COORDINATE |
|---|---|---|
| 1 | RAMENYA-SAN | N 35° 37' 40" E 139° 43' 57" |
| 2 | NOODLE SHOP | N 35° 36' 45" E 139° 40' 27" |
| 3 | 03-1234-5678 | N 35° 37' 17" E 139° 44' 06" |
| 4 | NEAR SAKURADAI | N 35° 35' 14" E 139° 42' 42" |
| 5 | 1-8-15 KONAN, MINATOKU, TOKYO | N 35° 37' 37" E 139° 44' 50" |
| 6 | TOKYO TOWER | N 35° 39' 19" E 139° 44' 53" |
| 7 | COORDINATE: N 35° 39' 12" E 139° 45' 28" | N 35° 39' 12" E 139° 45' 28" |
| 8 | ... | ... |

FIG.3

NAVIGATION DEVICE, DIGITAL MAP DISPLAY SYSTEM, DIGITAL MAP DISPLAYING METHOD IN NAVIGATION DEVICE, AND PROGRAM

BACKGROUND OF THE INVENTION

1. Field of the Invention

This invention relates to a navigation device using digital map information, a digital map display system for displaying digital map information, and a digital map displaying method in a navigation device.

2. Description of the Related Art

Recently, navigation devices which can find their own positions and traveling speeds in real time by using GPS (Global Positioning System) satellites orbiting up in the skies have been becoming popularized for being carried on a mobile unit such as an automobile or for portable use. In such navigation devices, electronic map data is used and a map is displayed on its monitor on the basis of the map data. Moreover, the position where the user is, positioned by the GPS, and a traveling route for guidance and the like are displayed in an overlapping manner on the map.

Some of such navigation devices have a function to display a list of user-registered indexes so that the user can easily search for a predetermined spot. This user-registered indexes include spot information stored in a database within the navigation device by the user's operation. For example, in the case of guidance by the navigation device, the spot information includes the history of a spot set as a destination spot, the history of spot information extracted as a result of telephone number search, address search, name search and coordinate search carried out by the user, information of a spot registered by the user, and so on. As the indexes of such spot information are displayed in a list to the user and the user selects an index indicating a predetermined spot from the list, the user can easily find out the predetermined spot.

However, the indexes of the list displayed in the above-described technique are simple information such as telephone number, address, latitude and longitude, and place name indicating the vicinity of the predetermined spot. For example, if no specific name or place name is appended to a spot extracted by telephone number search, only the telephone number is displayed as its index. Similarly, if no specific place name is appended to a spot registered by scrolling a map and using a pointer, only the latitude and longitude of the spot are displayed as its index. Therefore, information about what meaning the spot has or what kind of facility it is, is not displayed. As a result, when a list is displayed, the user must search for a predetermined spot on the basis of only the simple information from the list and it takes a long time to find out the predetermined spot.

SUMMARY OF THE INVENTION

In view of such a technique problem, it is an object of this invention to provide a navigation device and the like which enables the user to effectively search for a predetermined spot.

In order to achieve the above-described object, a navigation device according to this invention is adapted for displaying a positioned current position and a digital map based on map data made up of electronic information, and comprises registration means for registering an index designated by a user's operation and data of a spot coordinate in association with each other, and display means for displaying a plurality of registered indexes as a list. The display means displays, together with the list, a digital map of a spot coordinate corresponding to an index selected from the indexes.

In this navigation device, as the digital map of the spot coordinate corresponding to the selected index is displayed together with the list, it is possible to inform the user of spot information about the index. The index is a name provided to each of the registered spot coordinate data, for example, spot name, landmark name, telephone number, address, coordinate and the like. The positioning of the current position in the navigation device can be carried out, for example, on the basis of signals sent from a plurality of GPS satellites.

This navigation device may further comprise extraction means for extracting the digital map of the selected index from the map data on the basis of the data of the spot coordinate.

The display means may also display additional information about the vicinity of the spot coordinate together with the digital map. In this case, the additional information is information such as weather information acquired from outside via a network.

This invention also provides a digital map display system. This digital map display system is adapted for displaying a digital map based on map data made up of electronic information, and comprises registration means for registering an index of a predetermined spot in the digital map in accordance with a user's operation, and display means for displaying a plurality of registered indexes in response to a request from the user. The display means displays an image associated with a predetermined index selected by the user from the indexes, together with the plurality of indexes displayed by the display means.

In this digital map display system, for example, the registration means may register data of the spot coordinate of the predetermined position together with the indexes, and the display means may display a digital map extracted from the map data on the basis of the spot coordinate.

Moreover, this invention also provides a digital map displaying method in a navigation device. This digital map displaying method is adapted for the user in a navigation device for displaying a positioned current position and a digital map based on map data made up of electronic information, and comprises a step of registering an index designated by a user's operation and data of a spot coordinate in association with each other to a database, a step of displaying the index as a list, a step of reading, from the database, data of a spot coordinate associated with a predetermined index selected from the list, a step of extracting map data corresponding to the data of the spot coordinate thus read, and a step of displaying a digital map based on the map data together with the list.

Preferably, the step of displaying the digital map includes setting the display of the digital map together with the list in such a manner that the spot coordinate is substantially at the center of the digital map.

Furthermore, this invention also provides a program executed in a navigation device.

Thus, according to the present invention, the user can easily find out an index indicating a predetermined spot from a plurality of registered indexes.

BRIEF DESCRIPTION OF THE DRAWINGS

FIG. 3 is a view for explaining data stored in a list information storage unit.

DESCRIPTION OF THE PREFERRED EMBODIMENTS

Preferred embodiments of this invention will now be described in detail with reference to the attached drawings.

Figure 1:
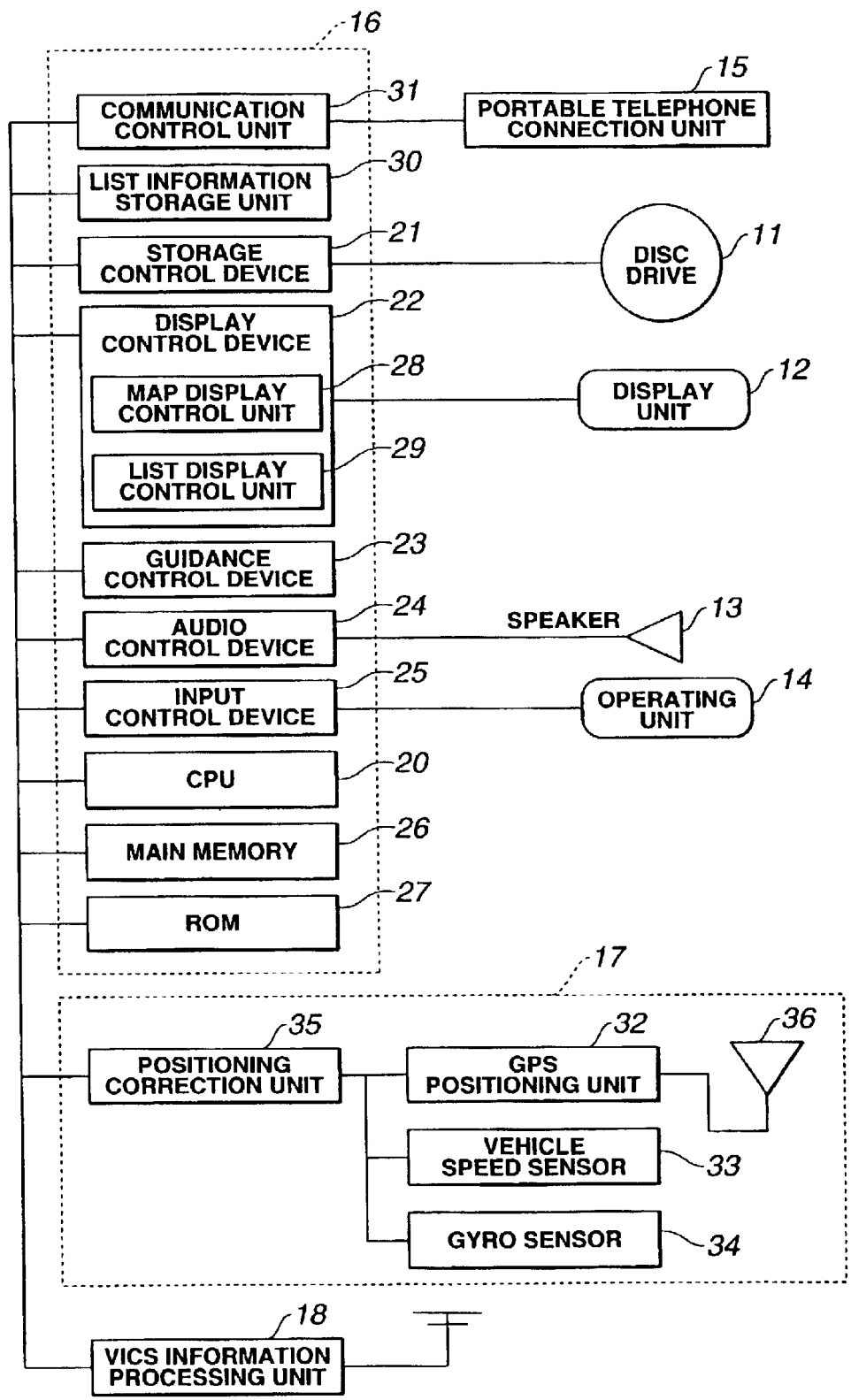
FIG. 1 shows the structure of a navigation device in an embodiment of this invention.

FIG. 1 is a block diagram for explaining the overall structure of a navigation device of this embodiment.

Figure 4:
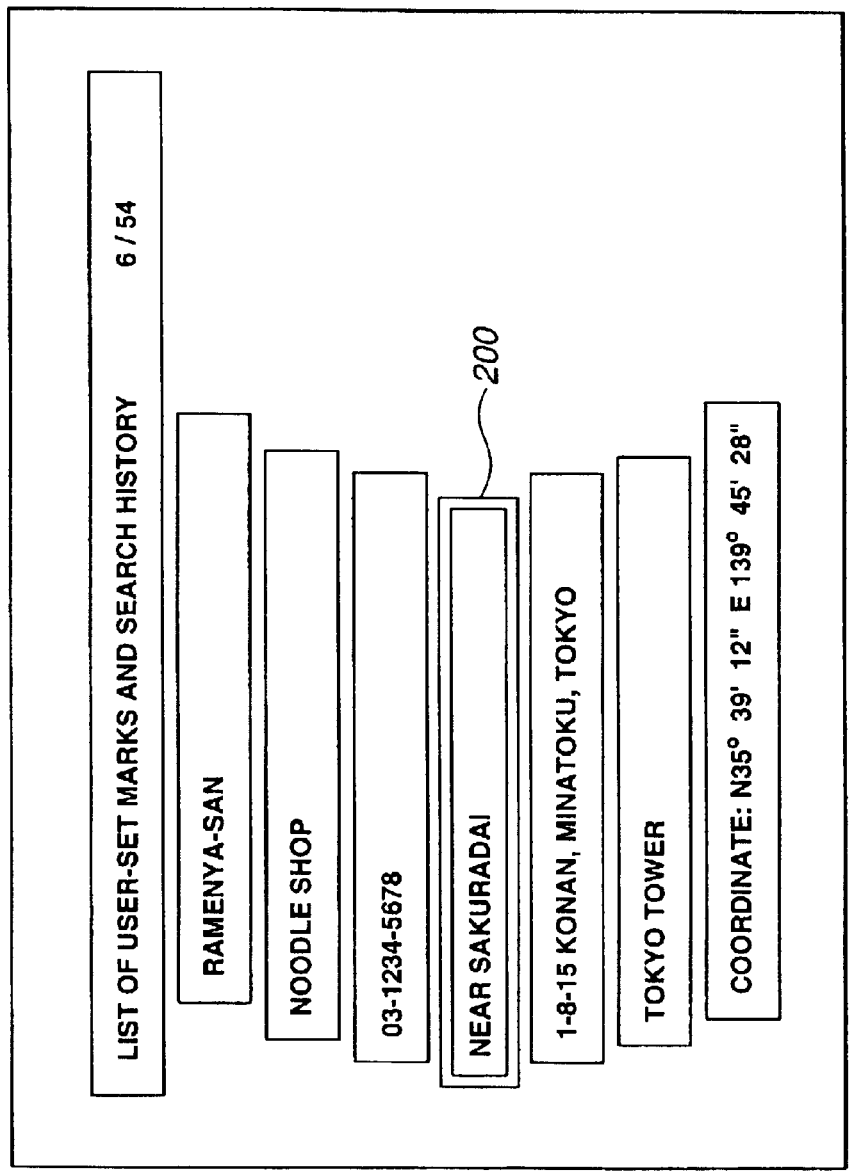
FIG. 4 shows an exemplary image displaying a list centering on an active index.

As shown in FIG. 4, the navigation device of this embodiment has the following constituent elements: a disc drive 11 for carrying a recording disc such as CD-ROM (compact disc read-only memory) or DVD-ROM (digital versatile disc read-only memory) on which map data of a predetermined wide area is stored; a display unit (display means) 12 made up of a monitor such as a liquid crystal display for displaying a map; a speaker 13 for outputting a guidance sound; an operating unit 14 such as a remote controller or a control panel; a potable telephone connection unit 15 which can be connected with a portable telephone used for connection with an external network; a control block 16 for controlling the entire system; a positioning block 17 for positioning; and a VICS information processing unit 18 connected with an antenna for receiving VICS information.

The control block 16 has the following units: a CPU 20 for carrying out control of the entire system and arithmetic processing; a storage control device 21 for controlling the disc drive 11 and the like; a display control device 22 for controlling data displayed by the display unit 12; a guidance control device 23 for controlling route guidance; an audio control device 24 for controlling a sound outputted from the speaker 13; an input control unit 25 for controlling an input signal from the operating unit 14; a main memory 26 as a internal storage made up of a DRAM (dynamic random access memory); a ROM 27 in which a predetermined program for actuating the navigation device is stored; a list information storage unit 30 for storing spot information registered by the user's operation, as a list; and a communication control unit 31 for controlling transmission and reception of data to and from the external network.

In the control block 16, the display control device 22 has a map display control unit 28 for causing the display unit 12 to display a map, and a list display control unit 29 for causing display of the list of spot information stored in the list information storage unit 30. The map display control unit 28 causes the display unit 12 to display a map based on map data stored on the recording disc held by the disc drive 11 and the result of positioning (position of the navigation device) from a positioning correction unit 35 of the positioning block 17, in such a manner that the map and the result of positioning overlaps with each other, similarly to an ordinary navigation device.

The map display control unit 28 also sets the scale of the map displayed on the display unit 12. The map data stored on the recording disc contains map data having a plurality of types of scales. The user can arbitrarily select the scale of the map data read out from the recording disc, that is, the scale of the map displayed on the display unit 12, by operating the operating unit 14.

The positioning block 17 has the following units: a GPS antenna 36 for receiving signals sent from GPS satellites; a GPS positioning unit 32 for positioning based on the signals obtained from the GPS antenna 36; a vehicle speed sensor 33 for detecting the speed of the vehicle carrying the navigation device; a gyro sensor 34 for detecting the rotational displacement of the vehicle; and a positioning correction unit 35 for correcting the result of positioning by the GPS positioning unit 32 on the basis of the detection values obtained by the vehicle speed sensor 33 and the gyro sensor 34.

In the navigation device shown in FIG. 1, when a list of spot information registered by the user's operation is displayed on the display unit 12 in response to a request from the user, a digital map of a spot of one index (hereinafter referred to as active index) selected from the list can be displayed together with the list. Therefore, the user can easily find out an index indicating a target spot from the list. Hereinafter, the list display processing in the navigation device will be described in detail.

Figure 2:
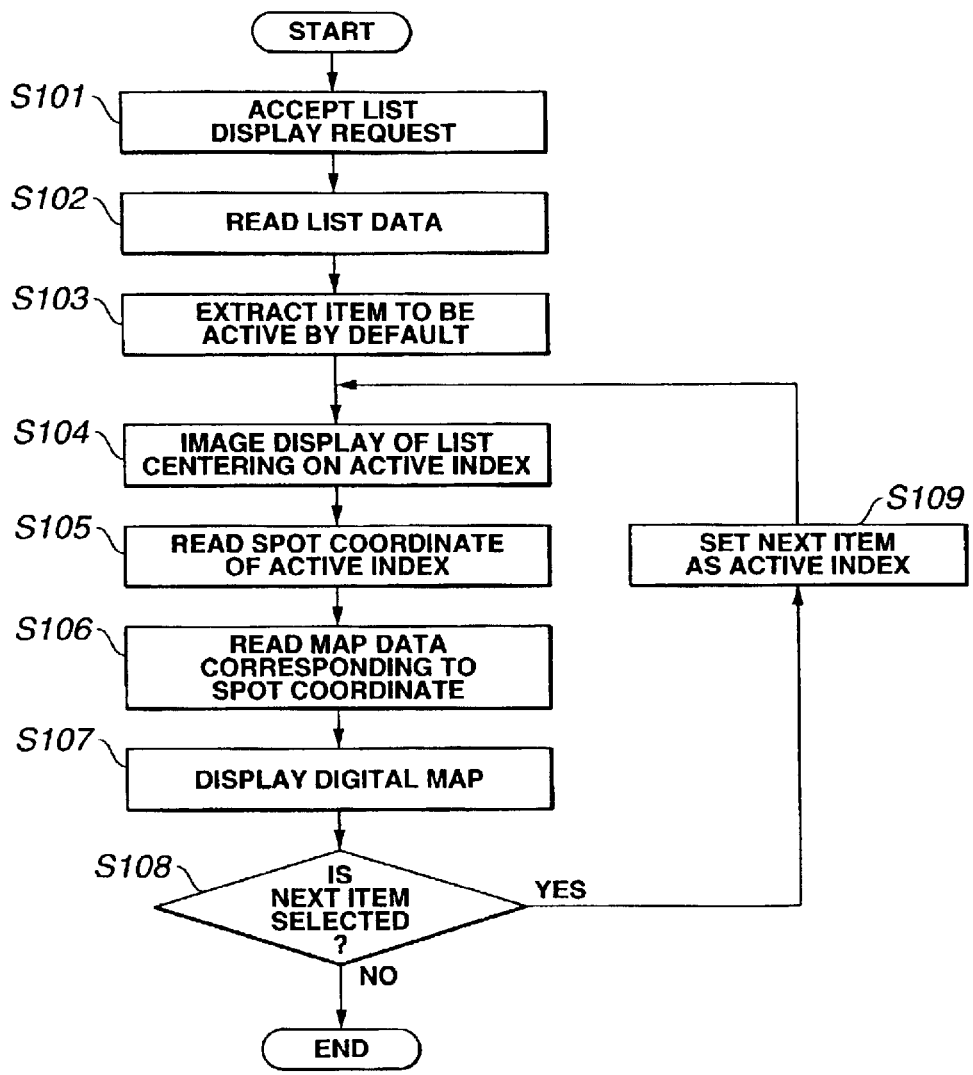
FIG. 2 is a view for explaining the flow of list display processing in the navigation device.

FIG. 2 is a view for explaining the flow of the list display processing in the navigation device.

First, in the navigation device, the input control device 25 accepts a list display request from the user, inputted through the operating unit 14 (step S101). This operation is carried out, for example, as the user selects an item of "history list display of a spot registered by the user" from an operation menu displayed to the user via the display unit 12. Then, in the navigation device which accepted the list display request, the list display control unit 29 of the display control device 22 reads list data stored in the list information storage unit 30 (step S102).

The list data stored in the list information storage unit 30 includes data representing a spot which was reached in the past on the basis of the navigation by the navigation device, a spot which was extracted as a result of telephone number search, address search, name search and coordinate search carried out by the user in the past, and a spot which was registered as the user registered a predetermined spot. Specifically, the number for identification, the name of the spot (index), and the coordinate data of the spot are registered for each index in the list information storage unit 30, as shown in FIG. 3. As for the name of the spot, for example, if the spot is extracted as a result of telephone number search and there is no specific place name or landmark (for example, Tokyo Tower) at the spot or near the spot, the telephone number is registered instead of the name of the spot. If the spot is registered by scrolling the map and using a pointer and there is no specific place name or landmark at the spot or near the spot, the coordinate of the spot is registered instead of the name of the spot. Similarly, if the spot is extracted as a result of search based on address, a typical name of the vicinity of the spot is registered by default. This name can be changed arbitrarily by the user's operation.

Having read the list data, the list display control unit 29 extracts an index to be active by default from the list displayed to the user (step S103). The processing to make an index active is to select one index from the list containing a plurality of indexes in order to process the one index. At step S103, when the list is first displayed to the user, a pre-registered index is displayed in an active state. The pre-registered index may be any index stored in the list information storage unit 30. For example, it may be an index which was made active in the previous operation or an index of No.1. The default index may also be set by the user.

Next, the list display control unit 29 causes the display unit 12 to display an image showing a list of indexes centering on the active index (step S104). FIG. 4 shows an exemplary image showing the list centering on the active index. In FIG. 4, an index "near Sakuradai" denoted by a numeral 200, situated at the center of the list, is an active index extracted as a default active index at step S103. The other indexes are continuously listed up above and below this active index. It is preferred to employ a display for discriminating the active index from the other indexes, for example, a display with a double frame as shown in FIG. 4.

Then, in the navigation device, the storage control device 21 reads data of the spot coordinate of the active index from the list information storage unit 30 (step S105). For example, in the case where the index "near Sakuradai" is an active index as shown in FIG. 4, the storage control device 21 reads data of the spot coordinate "N35° 35'14", E139° 42'42'"" corresponding to the index "near Sakuradai" from the data stored in the list information storage unit 30 shown in FIG. 3.

On the basis of the data of the spot coordinate thus read, the storage control device 21 reads map data corresponding to the spot coordinate from the recording disc held by the disc drive 11 (step S106). The range of the map data read at this point may be arbitrarily set, but it is preferred to use a scale which provides detailed information of the vicinity of the spot coordinate.

Figure 5:
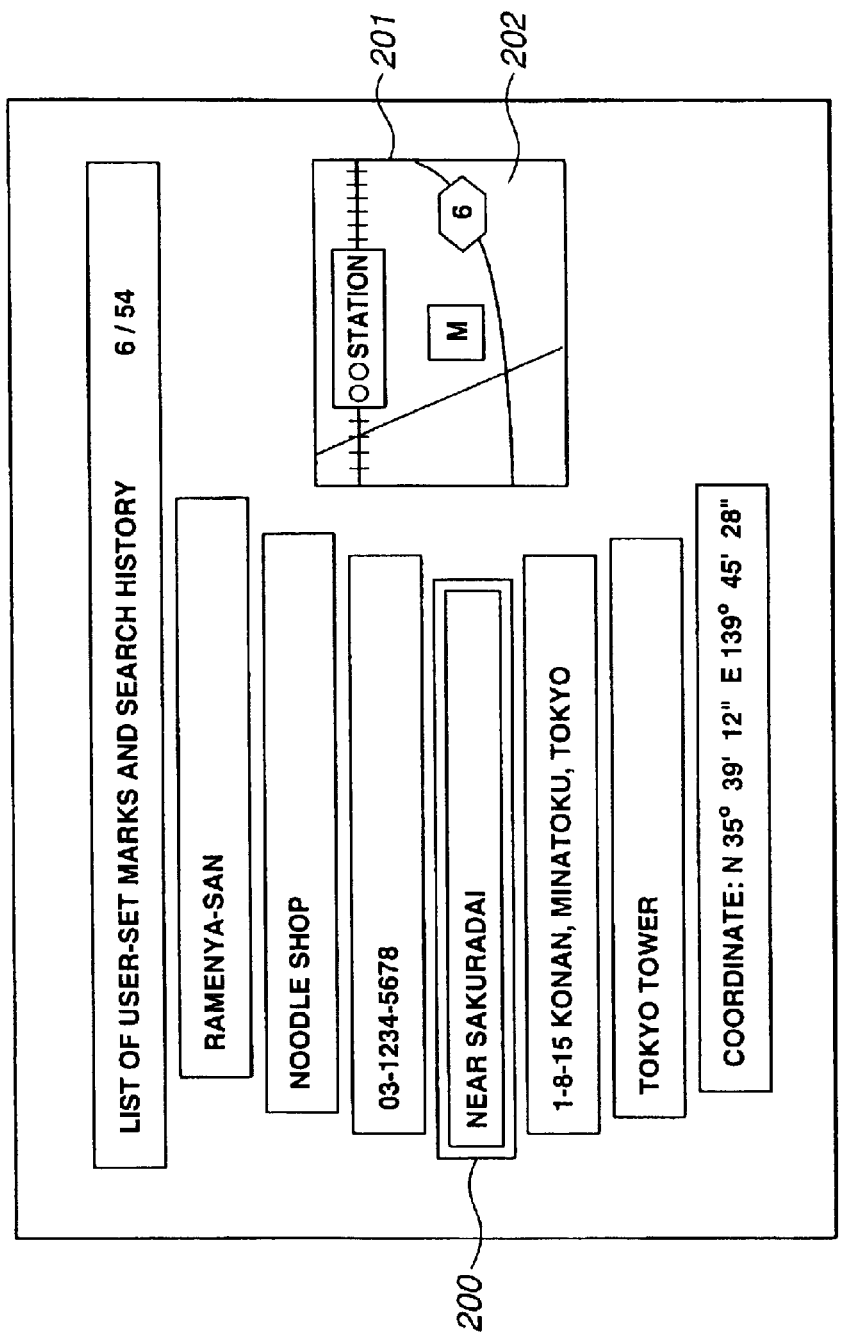
FIG. 5 shows an exemplary image displaying a digital map.

The map display control unit 28 causes the display unit 12 to display a digital map based on the map data read at step S106 (step S107). FIG. 5 shows an exemplary image showing a digital map. As shown in FIG. 5, in this image, a digital map 202 is displayed beside the active index "near Sakuradai" in such a manner that the spot coordinate is situated at the center of a display frame 201 of the digital map. In this case, the plurality of indexes displayed in the list are sequentially arrayed in a curved form as a whole so that the active index at the center of the display area is on the most left-hand side while the uppermost index or the lowermost index in the display area is on the most right-hand side. Therefore, the largest space is formed on the right side of the active index in FIG. 5 and the digital map 202 can be easily displayed there. By thus constituting the display area, the active index and the digital map 202 can be visually associated with each other easily. In the case of a left-hand drive car, the respective indexes may be arrayed to form the display frame 201 on the left side in the display area so that the digital map 202 is displayed at a position closer to the driver's seat.

Next, the navigation device determines whether or not the next index was selected by the user from the indexes displayed in the list (step S108). The next index is an index which is situated immediately above or below the active index, of the indexes displayed in the list as shown in FIG. 5. For example, as the user scrolls the list display, the next index is selected. If the navigation device determines that the next index was selected, the navigation device sets the next index as an active index (step S109). With respect to this active index, the processing returns to step S104 and processing similar to the above-described processing is started.

On the other hand, if the navigation device determines at step S108 that the next index was not selected, the processing ends.

As described above, in the navigation device of this embodiment, when displaying the list of the spot registered by the user's operation, the digital map for the active index can be displayed. In this digital map, for example, information such as the names of the surrounding places, various landmarks (facility and building names or the like), intersections, interchanges (IC), junctions (JC), service areas (SA) and parking areas (PA) of freeways, which would be shown in a map, and the names of spots (intersection names, IC names or the like) can be displayed. On the basis of the digital map thus displayed, the user can grasp the information of the spot indicated by the index. Therefore, the user can easily determined whether the spot is a search target spot or not.

The digital map displayed for the active index is not a preset map but is extracted each time from the map data on the basis of the spot coordinate corresponding to the active index. Therefore, data of a digital map to be displayed for each index need not be formed in advance and increase in the volume of data recorded in the navigation device can be prevented.

In the above-described embodiment, the digital map associated with the active index in the list display is displayed. However, information displayed in association with the active index is not limited to the digital map. Hereinafter, another example of information displayed in association with the active index will be described.

Figure 6:
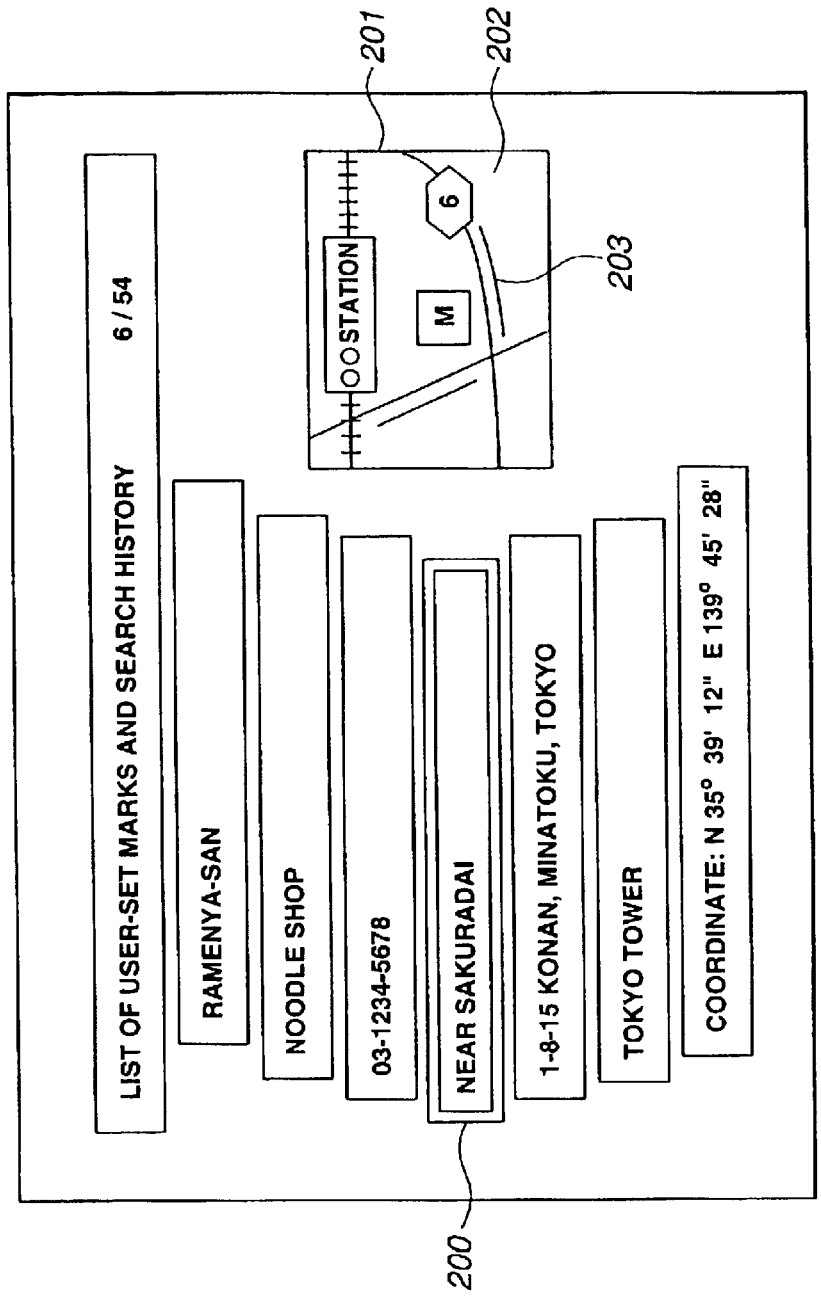
FIG. 6 shows another exemplary image including information displayed in association with an active index.

FIG. 6 shows another exemplary image including information displayed in association with the active index.

In FIG. 6, the status of congestion on a road included in the map data of the spot coordinate of the active index is shown. Specifically, in FIG. 6, a part denoted by a numeral 203 in the digital map 202 represents a traffic congestion site. In order to display such traffic information, first, the VICS information processing unit 18 in the navigation device receives VICS information of the vicinity of the spot coordinate of the active index via the antenna. Then, on the basis of the spot coordinate of the active index, the map display control unit 28 prepares map data containing the VICS information of the spot coordinate and causes the display unit 12 to display the map data. The VICS information is traffic information such as traffic congestion, accidents, traffic control and parking lots, provided in real time by using beacon signs (information communication facilities) installed on the roads or FM (frequency modulation) multiplex broadcasting.

As the traffic information is thus displayed together with the digital map 202, when the user searches for a target spot, the user can easily determine whether to select the spot indicated by the index, as a target spot, on the basis of the traffic information. Specifically, when the traffic congestion information is displayed, the user can stop setting the spot as a target spot and search for another target spot.

Figure 7:
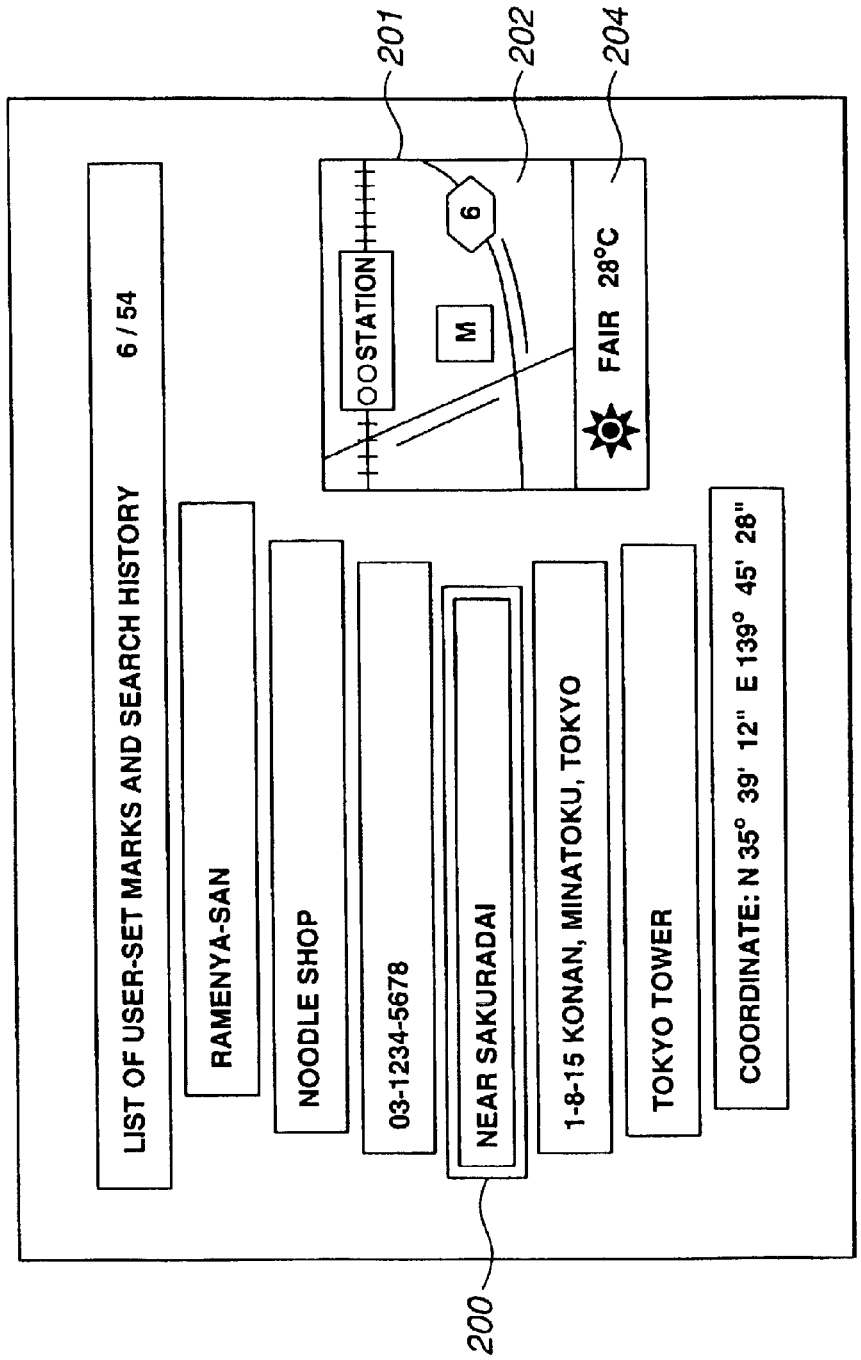
FIG. 7 shows still another exemplary image including information displayed in association with an active index.

The information associated with the spot coordinate, which is acquired from the external network and displayed to the user, may be other than traffic information. For example, as shown in FIG. 7, weather information (denoted by a numeral 204) including the weather and temperature at the spot coordinate of the active index can be displayed in the display frame 201. In this case, in the navigation device, the communication control unit 31 connects to the external network such as the Internet via the portable telephone connected to the potable telephone connection unit 15 and sends data of the spot coordinate of the active index to a server connected to the external network. In response to this, the server sends data of weather information of the vicinity of the spot coordinate to the portable telephone. The communication control unit 31 receives the data of the weather information received via the portable telephone. Then, the map display control unit 28 causes the display unit 12 to display the weather information 204 together with the digital map 202 within the display frame 201.

As the weather information 204 is thus displayed together with the digital map 202, the user can easily determine whether to select the spot indicated by the index, as a target spot. Specifically, when information is displayed that the weather is getting bad, the user can stop setting the spot as a target spot and search for another target spot.

Figure 8:
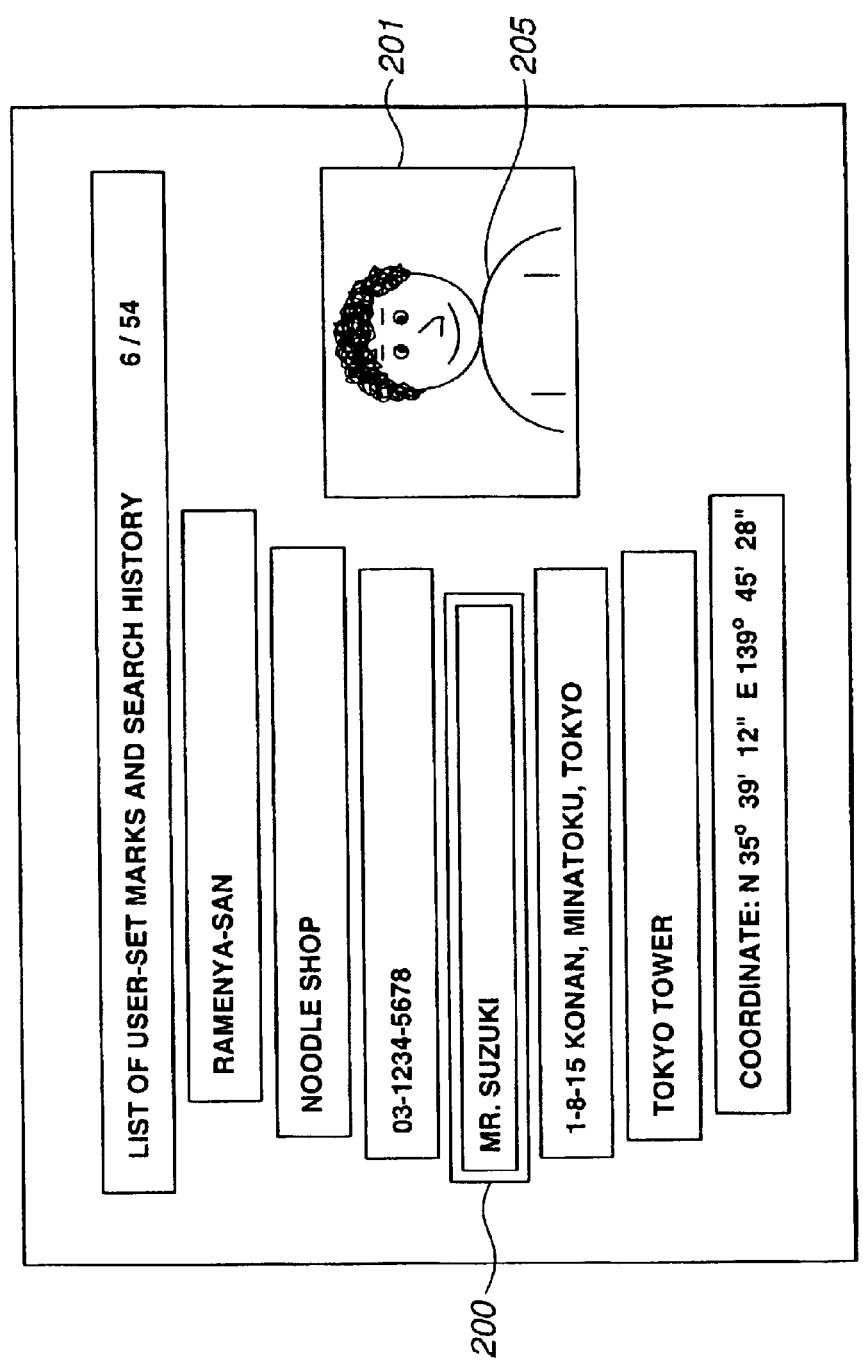
FIG. 8 shows a further exemplary image including information displayed in association with an active index.

FIG. 8 shows another exemplary image including information displayed in association with the active index.

In the image shown in FIG. 8, the active index is data designating a specific person named "Mr. Suzuki", and an image (for example, photograph of Mr. Suzuki) 205 associated with the active index is displayed in the display frame 201. This image is registered within the list information storage unit 30 by the user. Such image data can be acquired, for example, from the disc inserted in the disc drive 11 or from the external network via the portable telephone. The image data can be displayed together with the digital map of the spot coordinate. As such additional information is displayed for the active index, the user can search for an index indicating a predetermined post more easily.

The digital map in the above-described embodiments and the information added to the active index such as traffic information, weather information or a predetermined image can be displayed alone, but a plurality of items of such information can be displayed in parallel or displayed alternately for a predetermined time period. As a plurality of items of such information are displayed in parallel, the user can confirm the correlation between them. Although displaying a plurality of items of information requires a certain display area, it is possible provide a display area which is large enough for the user to confirm, by alternately displaying a plurality of items of information for a predetermined time period.

The processing flow described in the above-described embodiment is simply an example. The order of the processing steps may be changed as long as the same processing can be carried out.

Moreover, a program can be provided for carrying out the processing to display a digital map associated with an active index and other information together with a list, as described in the embodiment. Furthermore, this program may employ a form of storage medium or program transmission device as follows. Specifically, in the case of a storage medium, the above-described program may be stored to a storage medium such as CD-ROM, DVD, various memories including a semiconductor memory, or a hard disk, in such a manner that the program is readable a computer device such as a navigation device.

A program transmission device may have storage means such as CD-ROM, DVD, various memories including a semiconductor memory or a hard disk on which the above-described program is stored, and transmission means for reading the program from the storage means and transmitting the program to a device which executes the program, via a connector or a network such as the Internet or LAN. Such a program transmission device is suitable for installing a program for carrying out the above-described processing into a navigation device.

The constituent element described in the embodiment may be selected or omitted and various modifications may be effected without departing from the scope of this invention.

What is claimed is:

1. A navigation device for displaying a current position and a digital map based on map data made up of electronic information, the device comprising:

registration means for registering an index of spot information designated by an operation of a user, in which each spot information has a map coordinate associated therewith; and display means for displaying as a list a plurality of indexes registered by the registration means, wherein the display means displays, together with the list, a digital map using the map coordinate corresponding to an index selected from the plurality of indexes.

2. The navigation device as claimed in claim 1, further comprising extraction means for extracting the digital map of the selected index fed to the display means from stored map data using the map coordinate.

3. The navigation device as claimed in claim 1, wherein the display means displays additional information about a vicinity of the spot information together with the digital map.

4. The navigation device as claimed in claim 3, wherein the additional information is information acquired from outside the navigation device via a network.

5. A digital map display system for displaying a digital map based on map data made up of electronic information, the system comprising:

registration means for registering an index of a predetermined spot in the digital map in accordance with an operation of a user; and display means for displaying a plurality of indexes registered by the registration means in response to a request from the user, wherein the display means displays an image associated with a predetermined index selected by the user from the plurality of indexes, together with the plurality of indexes displayed by the display means.

6. The digital map display system as claimed in claim 5, wherein the registration means registers data of the spot coordinate of a predetermined spot together with the plurality of indexes, and the display means displays a digital map extracted from the map data on the basis of the spot coordinate.

7. A digital map displaying method in a navigation device for displaying a current position and a digital map based on map data made up of electronic information, the method comprising:

a step of registering in a database an index of spot information designated by an operation of a user, in which each spot information has a map coordinate associated therewith;

a step of displaying a plurality of indexes as a list;

a step of reading, from the database, data of a map coordinate associated with an index selected from the list;

a step of extracting map data corresponding to the data of the map coordinate read in the step of reading; and a step of displaying a digital map based on the map data extracted in the step of extracting together with the list.

8. The digital map displaying method in a navigation device as claimed in claim 7, wherein the step of displaying the digital map includes setting a display of the digital map together with the list so that the spot information is substantially at a center of the digital map.

9. A program for use in a navigation device, wherein the program causes the navigation device to execute:

a function to register in a database an index of spot information designated by an operation of a user in which each spot information has a map coordinate associated therewith;

a function to display a plurality of indexes as a list;

a function to read, from the database, data of a map coordinate associated with an index selected from the list;

a function to extract map data corresponding to the data of the map coordinate read by the function to read; and a function to display a digital map based on map data extracted by the function to extract together with the list.

* * * * *